(12) United States Patent
Cheng et al.

(10) Patent No.: US 11,245,336 B2
(45) Date of Patent: Feb. 8, 2022

(54) OVER-CURRENT PROTECTION MODULE AND RELATED OVER-CURRENT PROTECTION METHOD

(71) Applicant: Infinno Technology Corp., Hsinchu County (TW)

(72) Inventors: Yuan-Kai Cheng, Hsinchu County (TW); Chun-Chiang Chen, Hsinchu County (TW)

(73) Assignee: Infinno Technology Corp., Hsinchu County (TW)

( * ) Notice: Subject to any disclaimer, the term of this patent is extended or adjusted under 35 U.S.C. 154(b) by 1 day.

(21) Appl. No.: 16/893,325

(22) Filed: Jun. 4, 2020

(65) Prior Publication Data

US 2021/0021197 A1 Jan. 21, 2021

Related U.S. Application Data

(60) Provisional application No. 62/857,269, filed on Jun. 4, 2019.

(51) Int. Cl.
*H02M 3/335* (2006.01)
*H02M 1/32* (2007.01)
*H02M 1/00* (2006.01)

(52) U.S. Cl.
CPC ......... *H02M 3/33507* (2013.01); *H02M 1/32* (2013.01); *H02M 1/0009* (2021.05)

(58) Field of Classification Search
CPC .............................. H02M 1/32; H02M 1/0009
See application file for complete search history.

(56) References Cited

U.S. PATENT DOCUMENTS

| 2007/0041228 A1* | 2/2007 | Fang ................... H02M 1/32 363/50 |
| 2008/0291701 A1* | 11/2008 | Lin ..................... H02M 1/32 363/21.1 |
| 2011/0157924 A1* | 6/2011 | Huynh ............. H02M 3/33507 363/21.15 |

(Continued)

FOREIGN PATENT DOCUMENTS

CN 1592059 A 3/2005
CN 102256403 A 11/2011
(Continued)

*Primary Examiner* — Alex Torres-Rivera
(74) *Attorney, Agent, or Firm* — Winston Hsu

(57) ABSTRACT

An over-current protection module for a flyback power supply having a transformer includes: a switch control unit, configured to generate a control signal in a first period to control a transistor switch coupled to a primary side of the transformer, wherein the transistor switch is turned on in a first duty cycle of the control signal and the transistor switch is turned off in a second duty cycle of the control signal; a transformation unit, configured to generate a compensation current according to the second duty cycle; a timing control unit, configured to output the compensation current to an impedance unit to generate an impedance cross voltage in a shut-off period of the transistor switch of the first period; and a current control unit, configured to determine an over-current reference voltage according to the impedance cross voltage for the over-current protection module in a second period following the first period.

13 Claims, 6 Drawing Sheets

(56) References Cited

U.S. PATENT DOCUMENTS

| | | | | |
|---|---|---|---|---|
| 2011/0175587 A1* | 7/2011 | Hosotani | ........... | H02M 3/33515 |
| | | | | 323/283 |
| 2011/0292688 A1 | 12/2011 | Zhang | | |
| 2013/0135775 A1* | 5/2013 | Yao | ........................ | H02H 9/025 |
| | | | | 361/18 |
| 2014/0146581 A1* | 5/2014 | Tsou | ................. | H02M 3/33507 |
| | | | | 363/21.18 |
| 2014/0362621 A1* | 12/2014 | Huang | .................... | H02M 1/08 |
| | | | | 363/50 |
| 2015/0372605 A1 | 12/2015 | Karlsson | | |
| 2016/0226239 A1* | 8/2016 | Yang | ........................ | H02M 1/44 |
| 2018/0337591 A1* | 11/2018 | Shen | ................. | H02M 3/33507 |
| 2019/0334428 A1* | 10/2019 | Arima | ................ | H02M 3/33507 |
| 2020/0153342 A1* | 5/2020 | Takahashi | ................ | H02M 1/15 |

FOREIGN PATENT DOCUMENTS

| | | |
|---|---|---|
| TW | 201310835 A1 | 3/2013 |
| TW | 201830837 A | 8/2018 |

* cited by examiner

OVER-CURRENT PROTECTION MODULE AND RELATED OVER-CURRENT PROTECTION METHOD

CROSS REFERENCE TO RELATED APPLICATION

This application claims the benefit of U.S. provisional application No. 62/857,269, which was filed on 2019 Jun. 4 and is included herein by reference in its entirety.

BACKGROUND OF THE INVENTION

1. Field of the Invention

The present invention relates to an over-current protection module and related over-current protection method, and more particularly, to an over-current protection module and related over-current protection method capable of compensating a flyback power supply under a current mode control.

2. Description of the Prior Art

A conventional over-current (over-power) protection device for a flyback power supply usually has a fixed current limit. This is illustrated in FIG. 1, which is a schematic diagram of a current value Ipri of a primary side of a transformer of a conventional over-current protection device with different input voltages versus an operating time. A fixed current limit value CL for the over-current protection device may be set for performing an over-current protection mechanism. When the input voltage of the over-current protection device is a low input voltage (e.g., 110V), the over-current protection device is configured to perform the over-current protection mechanism when the current value Ipri reaches the fixed current limit value CL. The current value Ipri is affected by a circuit delay and usually inhibited or cut off when the current value Ipri slightly exceeds the fixed current limit value CL. When the input voltage of the over-current protection device is a high input voltage (e.g., 220V), since an increment speed of the current value Ipri is also high, if the over-current protection device performs the over-current protection mechanism until the current value Ipri reaches the fixed current limit value CL, the current value Ipri will only be inhibited or cut off after the current value Ipri hugely exceeds the fixed current limit value CL, which causes damage to or may even burn the elements. Therefore, the conventional over-current protection device's operation quality is easily affected by different input voltages or loadings.

To solve the above problems, different current limit values with respect to different conditions (e.g., different input voltages) may be set in the conventional over-current protection device, or with respect to different conditions (e.g., different input voltages), different current values Ipri are set corresponding to different initial values to ensure that the current values Ipri of the over-current protection device may be inhibited or cut off at a stable current value no matter whether the input voltage is low or high. FIGS. 2 and 3 are schematic diagrams of the current value of the primary side of the transformer of the conventional over-current protection device with different input voltages versus the operating time for compensation. In the example shown in FIG. 2, a compensation current limit CL2 for different input voltages is not identical to the fixed current values CL shown in FIG. 1, and is varied with respect to different conditions, to ensure that the current value Ipri will be inhibited or cut off at a stable current value (e.g., the fixed current limit value CL) for the low input voltage or the high input voltage. In the example shown in FIG. 3, different initial values of the current value Ipri with respect to different input voltages are set to ensure that the current value Ipri will be inhibited or cut off at a stable current value (e.g., the fixed current limit value CL) for the low input voltage or the high input voltage.

When the conventional over-current protection device is applied in different systems or environmental conditions, the current limit value or the initial value is required to be reset and circuit elements are required to be replaced, meaning the system cost is high and lacks flexibility. In addition, the circuit for the example shown in FIG. 2 is complicated and hard to implement. In the example shown in FIG. 3, a compensation current for the initial values of the current value Ipri is required, which increases jitter within the circuit and generates unnecessary ripples to an output voltage of the flyback power supply, directly affecting the output power quality. Therefore, improvements to the prior art are needed.

SUMMARY OF THE INVENTION

The present invention provides an over-current protection module and related over-current protection method to compensate a flyback power supply under a current mode control to solve the above problems.

In an aspect, the present invention discloses an over-current protection module, for a flyback power supply having a transformer, comprising: a switch control unit, configured to generate a control signal in a first period to control a transistor switch coupled to a primary side of the transformer, wherein the transistor switch is turned on in a first duty cycle of the control signal and the transistor switch is turned off in a second duty cycle of the control signal; a transformation unit, coupled to the switch control unit, configured to generate a compensation current according to the second duty cycle; a timing control unit, coupled to the transformation unit, configured to output the compensation current to an impedance unit to generate an impedance cross voltage in a shut-off period of the transistor switch of the first period; and a current control unit, coupled to the timing control unit and the impedance unit, configured to determine an over-current reference voltage according to the impedance cross voltage for the over-current protection module in a second period following the first period.

In another aspect, the present invention discloses an over-current protection method for controlling a flyback power supply having a transformer, comprising: generating a control signal in a first period to control a transistor switch coupled to a primary side of the transformer, wherein the transistor switch is turned on in a first duty cycle of the control signal and the transistor switch is turned off in a second duty cycle of the control signal; generating a compensation current according to the second duty cycle in the first period; outputting the compensation current to an impedance unit to generate an impedance cross voltage in a shut-off period of the transistor switch of the first period; and determining an over-current reference voltage according to the impedance cross voltage, so as to determine whether a current flowing through the transistor switch is higher than a current limit or not in a second period following the first period according to the over-current reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
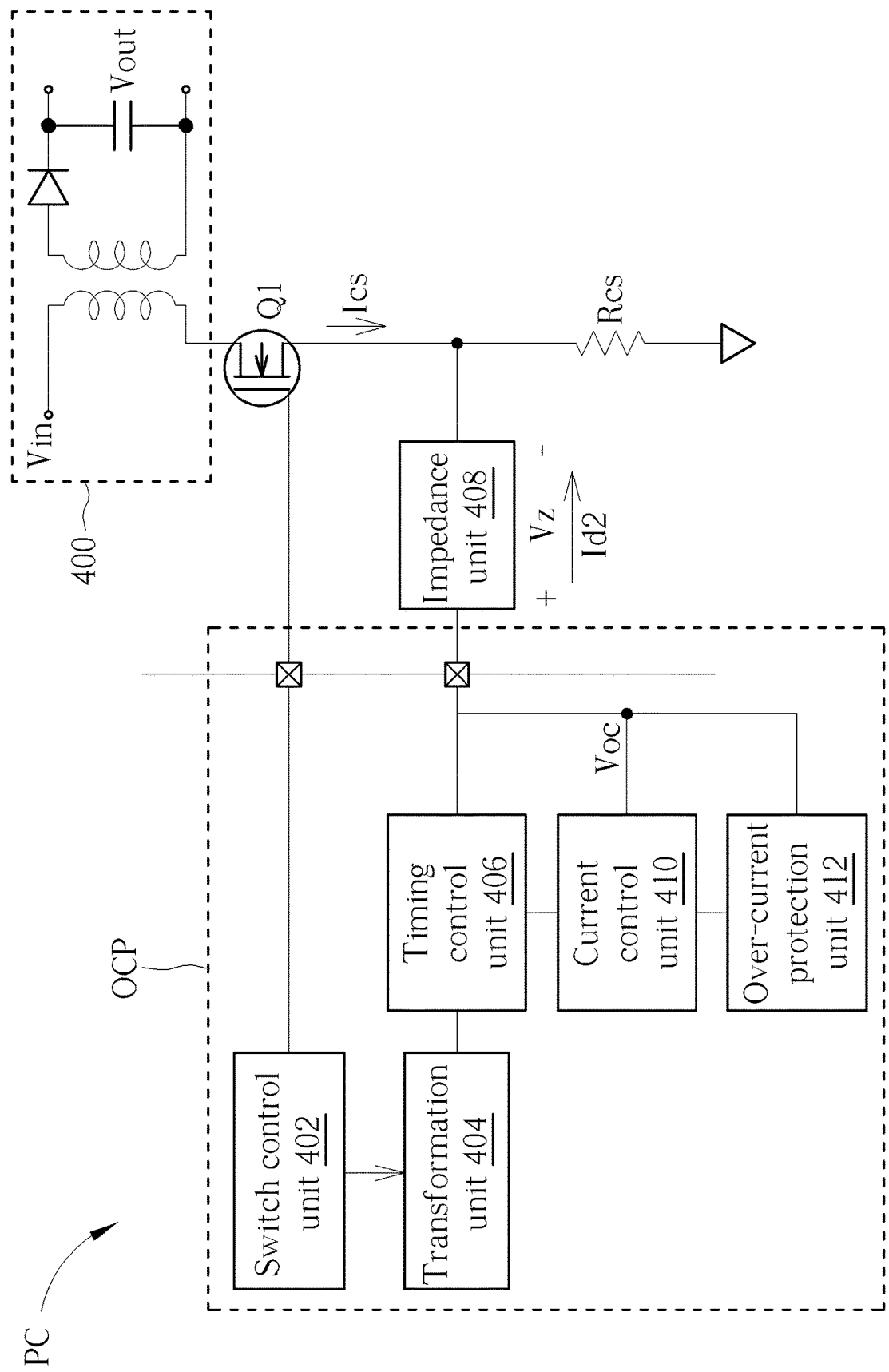
FIG. 4 is a schematic diagram of a flyback power supply applied to an over-current protection module according to an embodiment of the present invention.

Refer to FIG. 4, which is a schematic diagram of an over-current protection module OCP applied to a flyback power supply PC according to an embodiment of the present invention. The flyback power supply PC includes a transformer 400, a transistor switch Q1 and a resistor Rcs. A current limit, which is required for the flyback power supply PC, is utilized for activating an over-current protection measurement of the over-current protection module OCP when a current Ics flowing through a primary side of the transformer 400 is higher than the current limit.

The over-current protection module OCP may be implemented by an integrated circuit (IC) chip as an over-current protection chip, which includes a switch control unit 402, a transformation unit 404, a timing control unit 406, a current control unit 410 and an over-current protection unit 412. The switch control unit 402 is configured to generate a control signal CTRL to control the transistor switch Q1, which is coupled to the primary side of the transformer 400, wherein in a first duty cycle of the control signal CTRL, the transistor switch Q1 is turned on, and in a second duty cycle of the control signal CTRL, the transistor switch Q1 is turned off.

Figure 5:
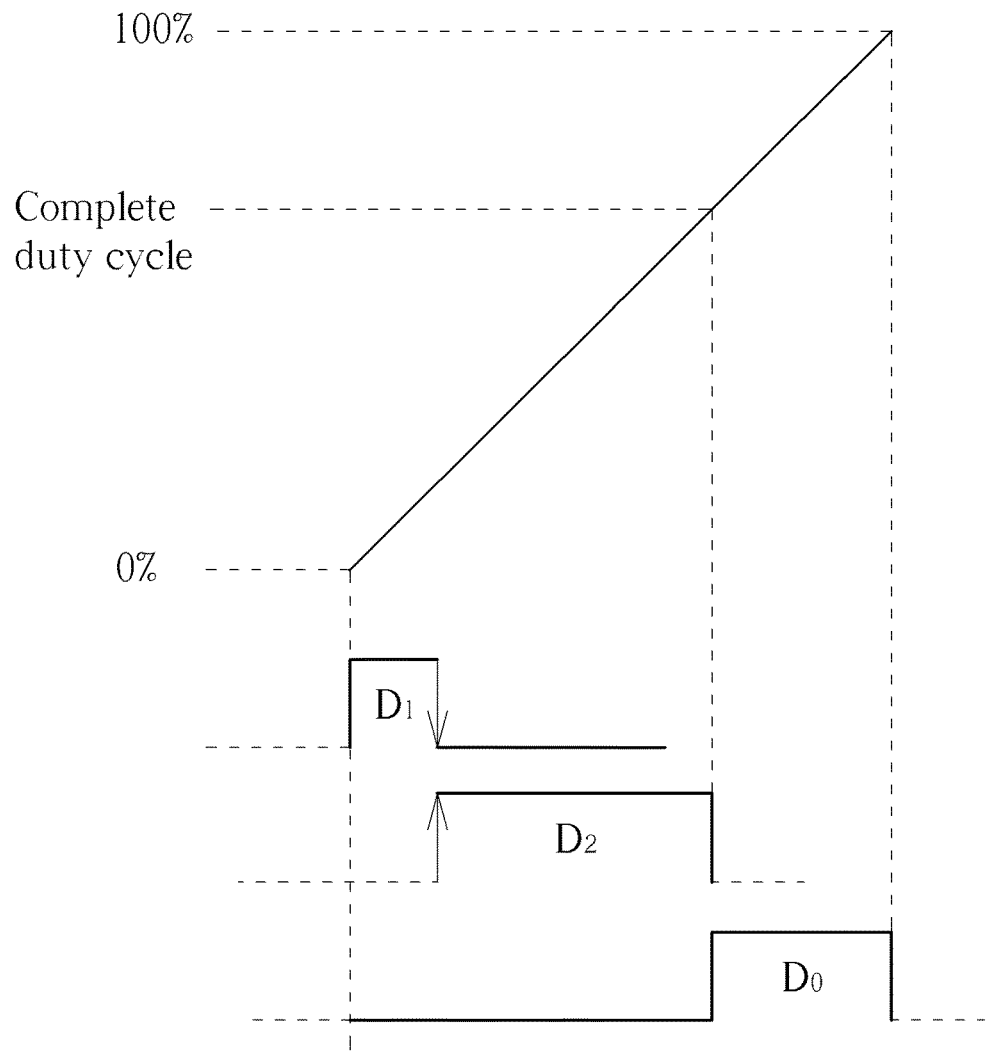
FIG. 5 is a schematic diagram of a control signal according to an embodiment of the present invention.

Refer to FIG. 5, which is a schematic diagram of a control signal CTRL according to an embodiment of the present invention. The control signal CTRL may be a pulse width modulation (PWM) signal. A first duty cycle D1, a second duty cycle D2 and a blank duty cycle D0 may be included in a period of the control signal CTRL. A total time period of the first duty cycle D1 and the second duty cycle D2 is fixed (i.e., a complete duty cycle shown in FIG. 5), wherein the blank duty cycle D0 is a blank duty cycle following the first duty cycle D1 and the second duty cycle D2 to protect the flyback power supply PC. In this example, the transistor switch Q1 is turned on in the first duty cycle D1 of the control signal CTRL, and when the first duty cycle D1 of the control signal CTRL is finished, the transistor switch Q1 is turned off; therefore, a duty cycle of the control signal CTRL is a ratio of a length of the first duty cycle D1 to the control signal CTRL.

Notably, since the length of the first duty cycle D1 of the switch control unit 402 is negative related to an input voltage, with requirements of the same output and loading, when the input voltage of the switch control unit 402 is higher, the first duty cycle D1 of the control signal CTRL is shorter (i.e., a time period of the transistor switch Q1 being turned on is shorter), and the second duty cycle D2 is longer, as the total time period of the first duty cycle D1 and the second duty cycle D2 is fixed. In contrast, when the input voltage of the switch control unit 402 is lower, the first duty cycle D1 of the control signal CTRL is longer (i.e., the time period of the transistor switch Q1 being turned on is longer), and the second duty cycle D2 is shorter. A current extracted by an output voltage or a loading of the flyback power supply is positively related to the length of the first duty cycle D1. That is, when the output voltage required by the flyback power supply PC is smaller or the current required by the loading is smaller, the length of the first duty cycle D1 is shorter. In contrast, the length of the first duty cycle D1 is longer. In addition, the first duty cycle D1 is controlled by a system error loop of the flyback power supply PC.

The transformation unit 404 is coupled to the switch control unit 402, and is configured to generate a compensation current Id2 according to the second duty cycle D2. The timing control unit 406 is coupled to the transformation unit 404, and the timing control unit 406 is configured to output a compensation current Id2 corresponding to the second duty cycle D2 to an impedance unit 408 within a shut-off period of the transistor switch Q1 (i.e., after the first duty cycle D1 is finished). The impedance unit 408 is coupled to the timing control unit 406, and is configured to generate an impedance cross voltage Vz when the timing control unit 406 outputs the compensation current Id2. For example, the impedance unit 408 may be a resistor or other impedance elements with a resistor value Z. The current control unit 410 is coupled to the timing control unit 406 and the impedance unit 408, and is configured to determine an over-current reference voltage Voc according to the impedance cross voltage Vz, so as to limit the current Ics flowing through the transistor switch Q1. In an embodiment, the current control unit 410 is configured to utilize the impedance cross voltage Vz and a constant K to generate an over-current compensation voltage Vcom (i.e., Vcom=Vz*K), and to determine the over-current reference voltage Voc according to an over-current upper bound voltage Voc_max and the over-current compensation voltage Vcom. The over-current upper bound voltage Voc_max and the constant K are determined by design requirements. In an embodiment, the over-current reference voltage Voc may be determined according to a difference between the over-current upper bound voltage Voc_max and the over-current compensation voltage Vcom, such that the over-current reference voltage Voc is the over-current upper bound voltage Voc_max minus the over-current compensation voltage Vcom (i.e., Voc=Voc_max−Vcom). The over-current protection unit 412 is coupled to the timing control unit 406, the impedance unit 408 and the current control unit 410, and is configured to perform the over-current protection measurement when the current Ics flowing through the transistor switch Q1 exceeds the current limit of the over-current protection module OCP.

Figure 6:
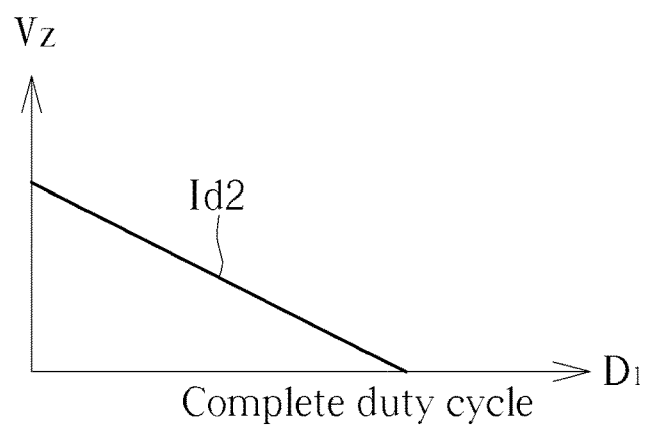
FIG. 6 is a schematic diagram of a relationship between an impedance cross voltage and a first duty cycle according to an embodiment of the present invention.

Refer to FIG. 6, which is a schematic diagram of a relationship between an impedance cross voltage Vz and the first duty cycle D1 according to an embodiment of the present invention. As shown in FIG. 6, the compensation current Id2 is generated according to the second duty cycle D2 by the transformation unit 404, and the impedance cross voltage Vz is a product of an impedance value Z of the impedance unit 408 and the compensation current Id2, such that a length of the second duty cycle D2 is maximized when a length of the first duty cycle D1 is zero, and the transformation unit 404 may correspondingly generate a maximal compensation current Id2 to the timing control unit 406. In contrast, when the length of the first duty cycle D1 nearly reaches the complete duty cycle, the length of the second duty cycle D2 is minimized, and the compensation current Id2 is minimized. As illustrated in the above, with the requirements of the same output and loading, the length of the first duty cycle D1 of the switch control unit 402 is negative related to the input voltage, which represents that the input voltage is positively related to the compensation current Id2. For example, the larger the input voltage, the larger the compensation current Id2 and the impedance cross voltage Vz, such that the current control unit 410 determines an over-current reference voltage Voc according to the impedance cross voltage Vz and obtains a smaller over-current reference voltage Voc. In contrast, when the input voltage is smaller, the current control unit 410 obtains a larger over-current reference voltage Voc.

Figure 1:
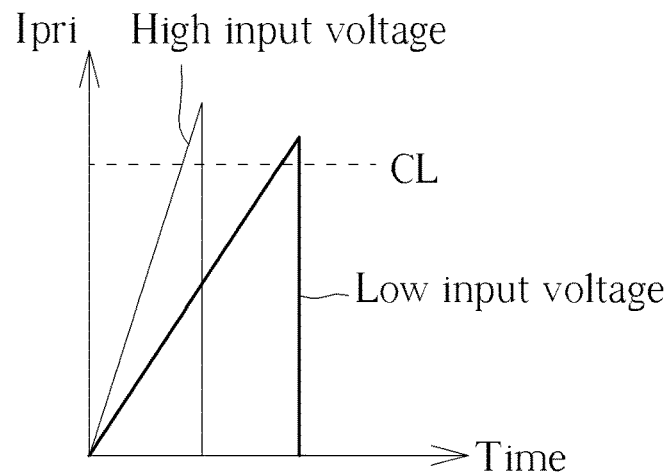
FIG. 1 is a schematic diagram of a current value of a primary side of a transformer of a conventional over-current protection device with different input voltages versus an operating time.
Figure 2:
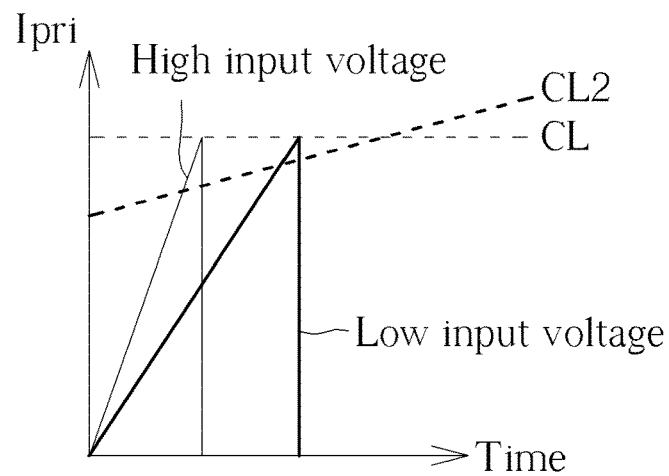
FIGS. 2 and 3 are schematic diagrams of the current value of the primary side of the transformer of the conventional over-current protection device with different input voltages versus the operating time for compensation.
Figure 3:
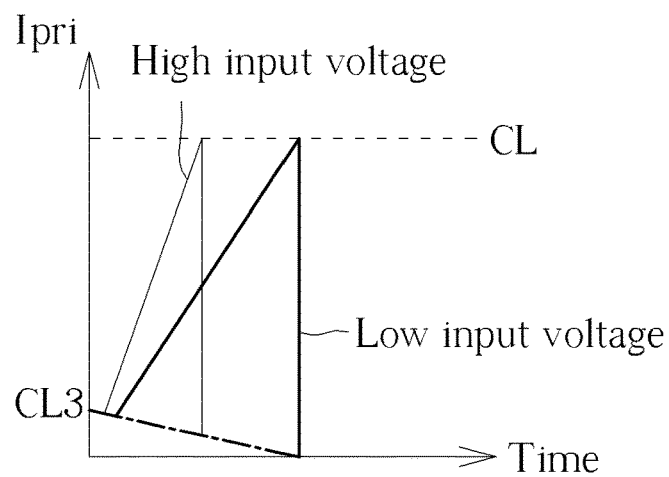

In this embodiment, the over-current protection module OCP performs the over-current protection mechanism based on the fixed over-current upper bound voltage Voc_max of the current control unit 410. As such, the issues in the prior art where circuits for changing current limits under different conditions are complicated and hard to implement as shown in FIG. 2, can be solved. In addition, by replacing the impedance unit 408, the over-current protection module OCP according to an embodiment of the present invention may be applied to different systems or environments, and thereby the system cost is reduced and the flexibility is improved.

Notably, in the embodiment of the present invention, the compensation current Id2 generated by the transformation unit 404 is outputted to the impedance unit 408 within the shut-off period of the transistor switch Q1 of the timing control unit 406 (i.e., after the first duty cycle D1 is completed). Since the transistor switch Q1 is shut off, the compensation current Id2 cannot affect the output voltage of the flyback power supply PC, such that an output power quality of the flyback power supply PC applying the over-current protection module OCP according to an embodiment of the present invention will not be affected.

In detail, the first duty cycle D1 and the second duty cycle D2 are included in one period of the control signal CTRL, and the transformation unit 404 generates the compensation current Id2 according to the second duty cycle D2. The timing control unit 406 outputs the compensation current Id2 to the impedance unit 408 to generate the impedance cross voltage Vz after the first duty cycle D1 is completed. Since the transistor switch Q1 is turned off, the current Ics flowing through the transistor switch Q1 is zero. Thus, the current control unit 410 determines the over-current reference voltage Voc according to the impedance cross voltage Vz, which is actually a function of the control signal CTRL for the following period. Therefore, the over-current protection module OCP according to an embodiment of the present invention utilizes the switch control unit 402 to control the second duty cycle D2 of the transistor switch Q1 in one period to generate a compensation current, to determine the over-current compensation voltage Vcom for the following period.

Whether the current Ics flowing through the transistor switch Q1 is higher than the current limit or not may be determined by the over-current reference voltage Voc. When the current Ics of the flyback power supply PC sensed by the over-current protection module OCP is higher than the current limit, the over-current protection unit 412 of the over-current protection module OCP is activated to perform the over-current protection measurement, e.g., by inhibiting or cutting off the current Ics, or directly terminating operation of the over-current protection module OCP after the over-current protection measurement is triggered multiple times. A user may replace the impedance unit 408 of the over-current protection module OCP, allowing the over-current protection module OCP to be applied to different systems or environments to prevent elements from damage or being burned down due to the current Ics of the flyback power supply PC exceeding original fixed current limits.

Figure 7:
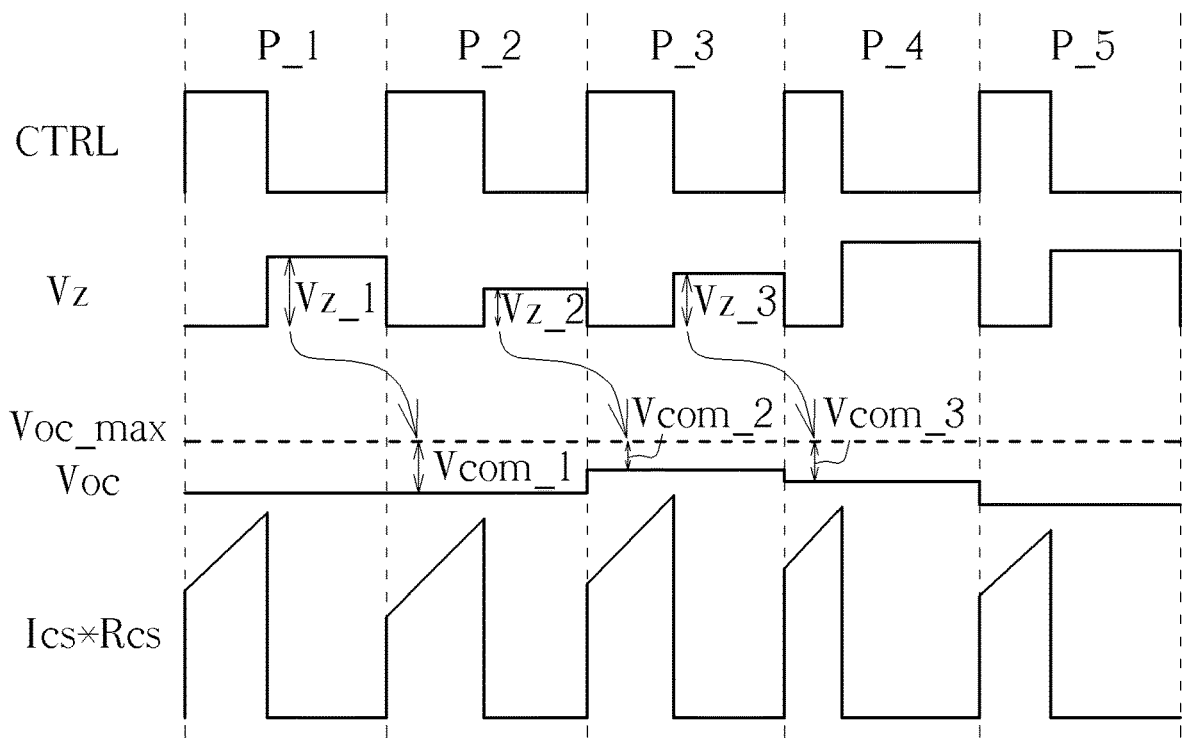
FIGS. 7 and 8 are signal timing diagrams of the over-current protection module according to an embodiment of the present invention.
Figure 8:
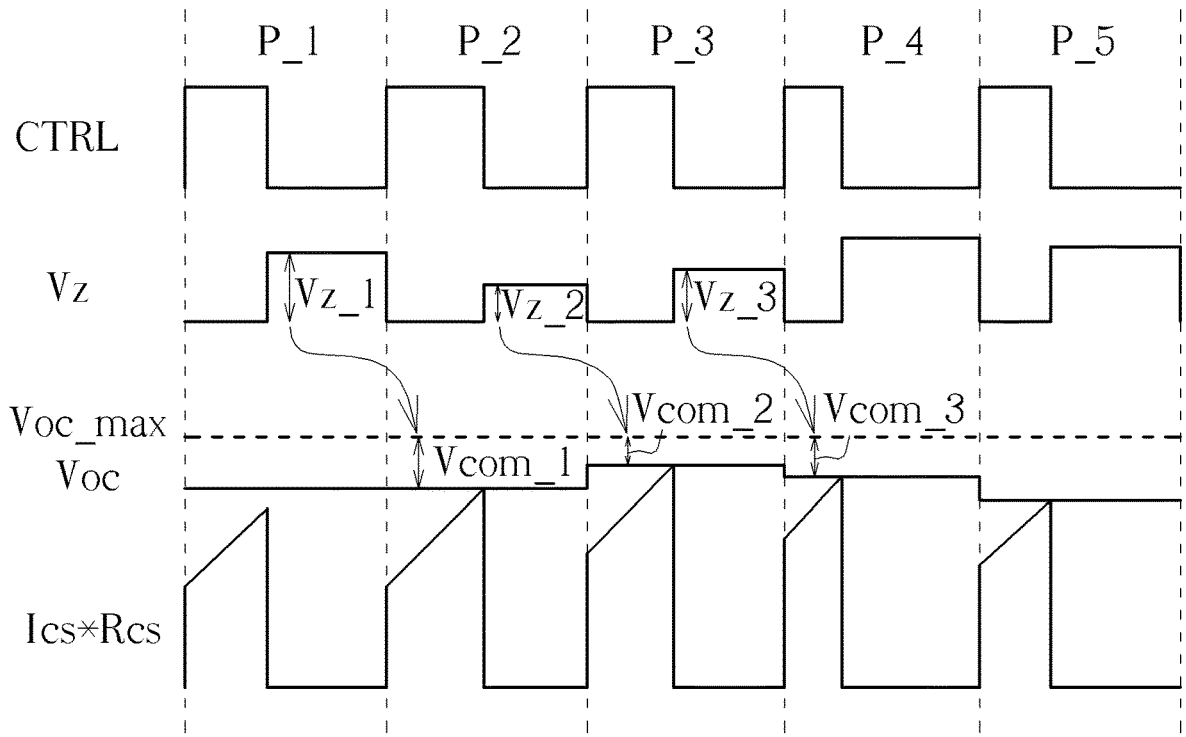

To explain how to determine whether the current Ics flowing through the transistor switch Q1 is higher than the current limit with respect to the over-current reference voltage Voc, refer to FIGS. 7 and 8, which are signal timing diagrams of the over-current protection module OCP according to an embodiment of the present invention. The switch control unit 402 is configured to generate the control signal CTRL to control the first duty cycle D1 in each period according to the input voltage, the output voltage or loading to turn on the transistor switch Q1. The transformation unit 404 generates the compensation current Id2 corresponding to the second duty cycle D2 of each period. The impedance cross voltage Vz is generated when the timing control unit 406 controls the compensation current Id2 flowing through the impedance unit 408. The over-current reference voltage Voc is determined by the over-current upper bound voltage Voc_max of the flyback power supply PC and an over-current compensation voltage Vcom in a previous period. First period P_1~fifth period P_5 are illustrated in FIG. 7, wherein the impedance cross voltage Vz_1 is generated according to the second duty cycle D2 of the control signal CTRL in the first period P_1, and the over-current compensation voltage Vcom_1=Vz_1*K and the over-current reference voltage Voc are generated accordingly for the second period P_2. The impedance cross voltage Vz_2 is generated according to the second duty cycle D2 of the control signal CTRL in the second period P_2, and the over-current compensation voltage Vcom_2=Vz_2*K and the over-current reference voltage Voc are generated accordingly for the third period P_3 and so forth. Since the second duty cycle D2 in the second period P_2 is shorter than in the first period P_1, the impedance cross voltage Vz_2 in the second period P_2 is smaller, which causes the over-current reference voltage Voc in the third period P_3 (i.e., generated in the second period P_2) to be higher than the over-current reference voltage Voc in the second period P_2 (i.e., generated in the first period P_1).

In FIG. 7, when the flyback power supply PC operates normally, a product of the current Ics flowing through the transistor switch Q1 and the resistor Rcs cannot achieve the over-current reference voltage Voc, which means that the current Ics flowing through the transistor switch Q1 is lower than the current limit, such that the over-current protection measurement of the over-current protection module OCP will not be activated. In this situation, as shown in FIG. 7, the over-current protection module OCP of the present invention still generates the corresponding over-current reference voltage Voc for the following period according to the over-current compensation voltage Vcom generated in each period.

In FIG. 8, when the flyback power supply PC operates abnormally, Ics*Rcs in the second period P_2 achieves the over-current reference voltage Voc in the second period P_2, which means that the current Ics flowing through the transistor switch Q1 is higher than the current limit. In this embodiment, the over-current protection measurement is activated by the over-current protection unit 412 of the over-current protection module OCP, and the transistor switch Q1 is turned off to inhibit the current Ics. In this situation, the over-current protection module OCP of the present invention still generates the corresponding over-current reference voltage Voc for the following period according to the over-current compensation voltage Vcom generated in each period.

Furthermore, the over-current protection module OCP according to an embodiment of the present invention may be implemented by the over-current protection chip, wherein the impedance unit 408 may be implemented inside the over-current protection chip (as illustrated in FIG. 4), i.e., the impedance unit 408 is connected to the over-current protection chip as an external element, such that a user may adjust or replace the impedance unit 408 according to requirements.

Figure 9:
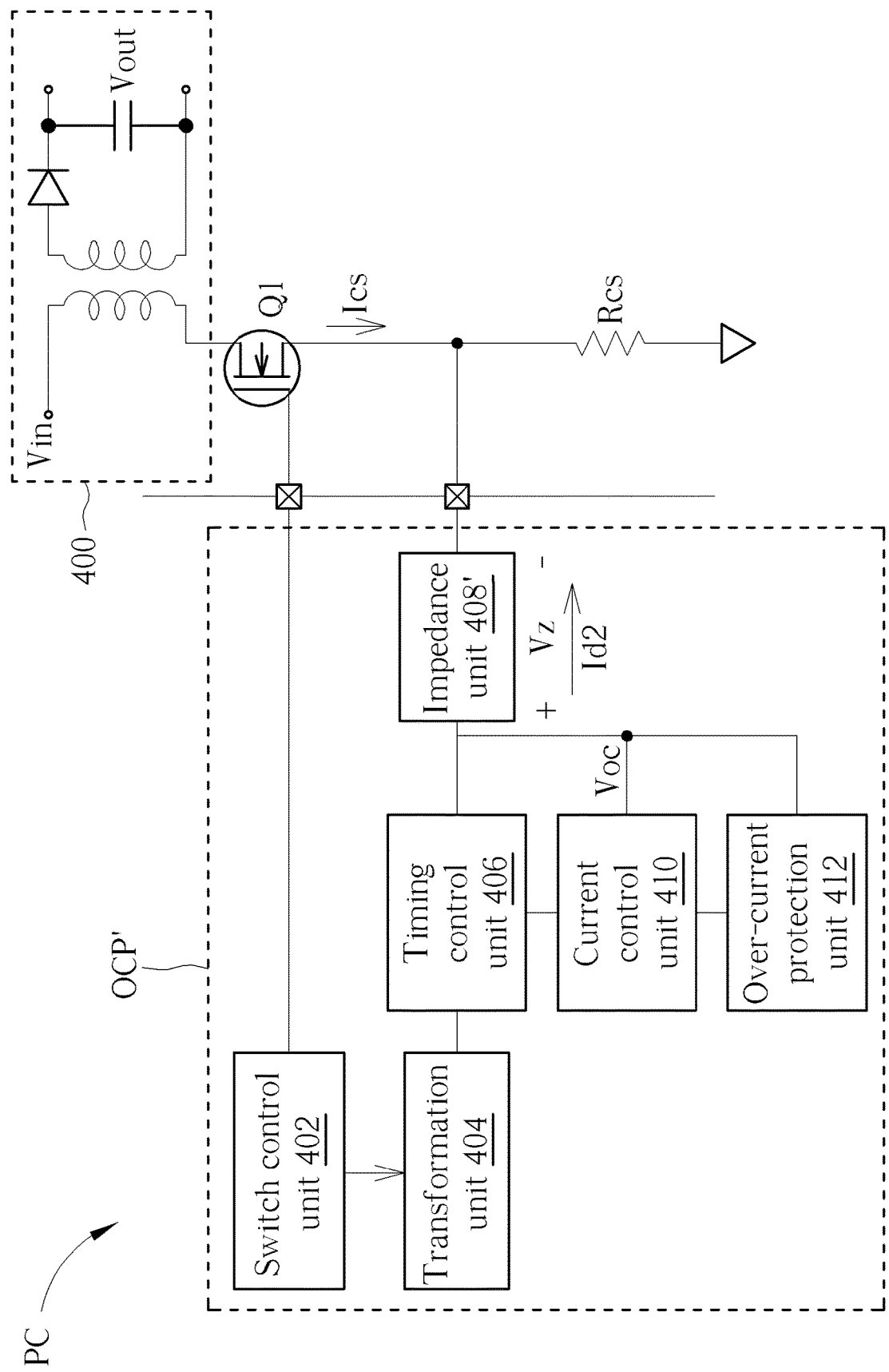
FIG. 9 is a schematic diagram of a flyback power supply according to another embodiment of the present invention.

Refer to FIG. 9, which is a schematic diagram of an over-current protection module OCP' according to another embodiment of the present invention. Since the over-current protection module OCP' is an alternative embodiment of the over-current protection module OCP, reference signs with the same function are inherited. Different from the over-current protection module OCP, an impedance unit 408' of the over-current protection module OCP' is implemented inside the over-current protection module OCP', and the impedance unit 408' is preferably adjustable (e.g., via coding or wired) inside the chip, such that the impedance unit 408' is directly implemented in the over-current protection chip to decrease the cost of the flyback power supply PC.

Figure 10:
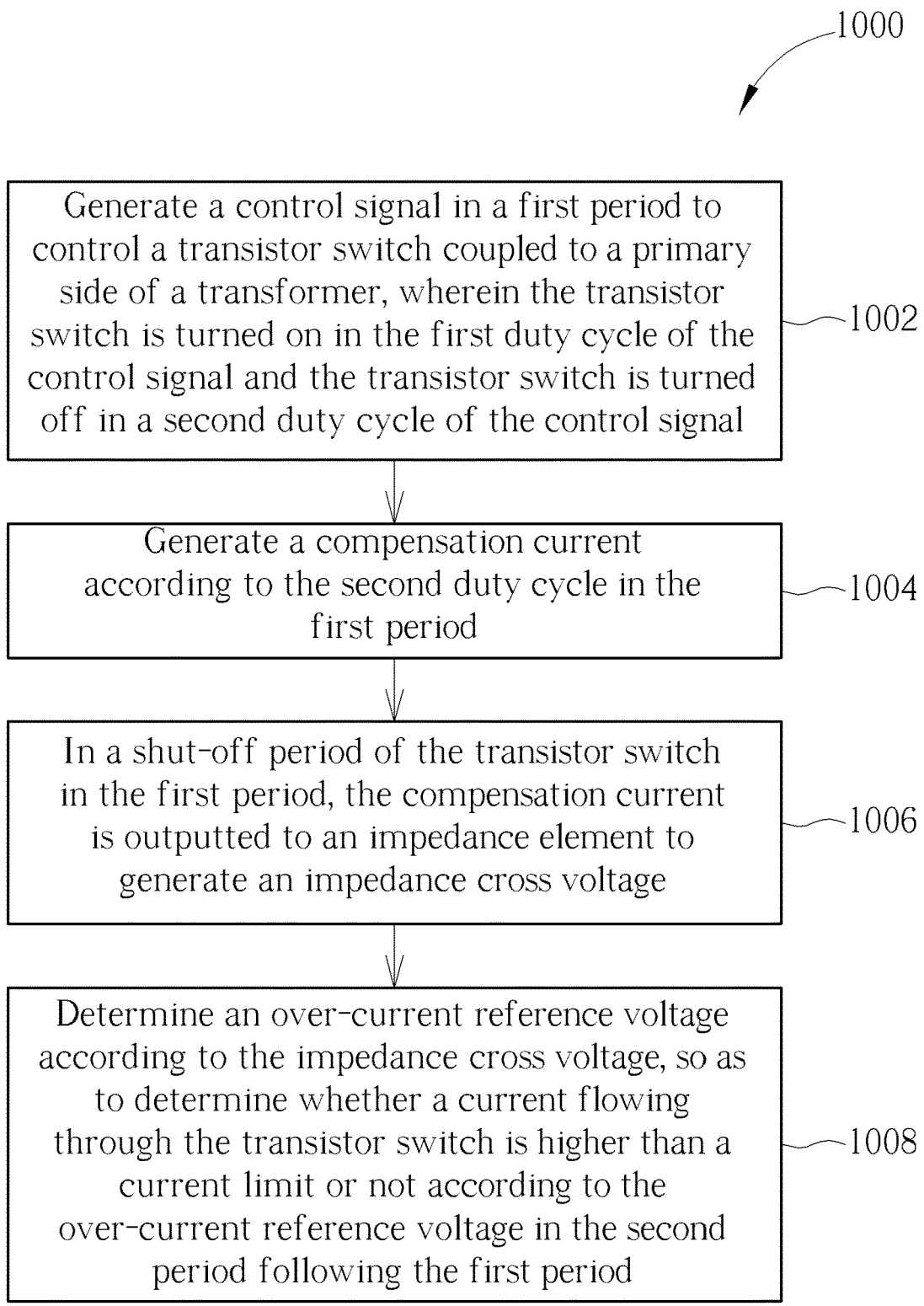
FIG. 10 is a schematic diagram of an over-current protection process according to an embodiment of the present invention.

An operation method of the over-current protection module OCP may be represented by an over-current protection process 1000 as shown in FIG. 10, wherein the over-current protection process 1000 includes the following steps:

Step 1002: Generate a control signal in a first period to control a transistor switch coupled to a primary side of a transformer, wherein the transistor switch is turned on in the first duty cycle of the control signal and the transistor switch is turned off in a second duty cycle of the control signal.

Step 1004: Generate a compensation current according to the second duty cycle in the first period.

Step 1006: In a shut-off period of the transistor switch in the first period, the compensation current is outputted to an impedance element to generate an impedance cross voltage.

Step 1008: Determine an over-current reference voltage according to the impedance cross voltage, so as to determine whether a current flowing through the transistor switch is higher than a current limit or not according to the over-current reference voltage in the second period following the first period.

An operation of the over-current protection process 1000 may be known by referring to the above embodiments, and will not be narrated herein for brevity.

In summary, the present invention provides an over-current protection module and an over-current protection process for a flyback power supply, which utilizes a duty cycle to generate a compensation current, such that an over-current reference voltage of the flyback power supply may be adjusted when the input voltage is varied. The current limit according to embodiments of the present invention is not required to be varied with respect to different conditions and thereby improves upon the prior art circuits which are complicated and hard to implement. In addition, when the over-current protection module according to an embodiment of the present invention is applied to different systems or environments, the system cost is reduced and the flexibility is improved by replacing the impedance unit. Moreover, in the embodiments of the present invention, the compensation current generated by the transformation unit is outputted to the impedance unit only within the shut-off period of the transistor switch, such that the output voltage of the flyback power supply will not be affected. Therefore, the output power quality of the flyback power supply applied with the over-current protection module according to an embodiment of the present invention will not be affected.

In this embodiment, the over-current protection module OCP is configured to perform an over-current protection mechanism using the fixed over-current upper bound voltage Voc_max of the current control unit 410, such that the current limit according to embodiments of the present invention is not required to be varied according to different conditions as in the prior art shown in FIG. 2, wherein associated circuits are complicated and hard to implement. In addition, by replacing the impedance unit 408 of the over-current protection module OCP of the present invention, the over-current protection module OCP according to an embodiment of the present invention may be applied to different systems or environments, which reduces the system cost and increases the flexibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An over-current protection module for a flyback power supply having a transformer, comprising:
    a switch control unit, configured to generate a control signal in a first period to control a transistor switch coupled to a primary side of the transformer, wherein the transistor switch is turned on in a first duty cycle of the control signal and the transistor switch is turned off in a second duty cycle of the control signal;
    a transformation unit, coupled to the switch control unit, configured to generate a compensation current according to the second duty cycle;
    a timing control unit, coupled to the transformation unit, configured to output the compensation current to an impedance unit to generate an impedance cross voltage in a shut-off period of the transistor switch of the first period; and
    a current control unit, coupled to the timing control unit and the impedance unit, configured to determine an over-current reference voltage according to the impedance cross voltage for the over-current protection module in a second period following the first period;
    wherein the current control unit is configured to determine the over-current reference voltage according to an over-current upper bound voltage and an over-current compensation voltage, wherein the over-current compensation voltage is a product of the impedance cross voltage and a constant.

2. The over-current protection module of claim 1, further comprising:

an over-current protection unit, coupled to the timing control unit, the impedance unit and the current control unit, wherein the over-current protection unit is configured to determine whether a current flowing through the transistor switch is higher than a current limit or not based on the over-current reference voltage in the second period.

3. The over-current protection module of claim 2, wherein the over-current protection unit is configured to determine whether a product of the current flowing through the transistor switch and a serial resistor achieves the over-current reference voltage or not to determine whether the current is higher than the current limit or not.

4. The over-current protection module of claim 2, wherein when the current flowing through the transistor switch exceeds the current limit, the over-current protection unit is configured to perform an over-current protection measurement.

5. The over-current protection module of claim 1, wherein the over-current protection module and the impedance unit are implemented inside an integrated circuit (IC) chip, and an impedance value of the impedance unit is adjustable.

6. The over-current protection module of claim 1, wherein the over-current protection module is implemented inside an integrated circuit (IC) chip, and the impedance unit is implemented outside the IC chip.

7. The over-current protection module of claim 1, wherein a length of the first duty cycle is negative related to an input voltage of the flyback power supply.

8. An over-current protection module for a flyback power supply having a transformer, comprising:
　a switch control unit, configured to generate a control signal in a first period to control a transistor switch coupled to a primary side of the transformer, wherein the transistor switch is turned on in a first duty cycle of the control signal and the transistor switch is turned off in a second duty cycle of the control signal;
　a transformation unit, coupled to the switch control unit, configured to generate a compensation current according to the second duty cycle;
　a timing control unit, coupled to the transformation unit, configured to output the compensation current to an impedance unit to generate an impedance cross voltage in a shut-off period of the transistor switch of the first period; and
　a current control unit, coupled to the timing control unit and the impedance unit, configured to determine an over-current reference voltage according to the impedance cross voltage for the over-current protection module in a second period following the first period;
　wherein the control signal further includes a blank duty cycle, such that the first duty cycle, the second duty cycle and the blank duty cycle form the first period, wherein a total time period of the first duty cycle and the second duty cycle is fixed.

9. An over-current protection method for controlling a flyback power supply having a transformer, comprising:
　generating a control signal in a first period to control a transistor switch coupled to a primary side of the transformer, wherein the transistor switch is turned on in a first duty cycle of the control signal and the transistor switch is turned off in a second duty cycle of the control signal;
　generating a compensation current according to the second duty cycle in the first period;
　outputting the compensation current to an impedance unit to generate an impedance cross voltage in a shut-off period of the transistor switch of the first period; and
　determining an over-current reference voltage according to the impedance cross voltage to determine whether a current flowing through the transistor switch is higher than a current limit or not in a second period following by the first period according to the over-current reference voltage;
　determining the over-current reference voltage according to an over-current upper bound voltage and an over-current compensation voltage, wherein the over-current compensation voltage is a product of the impedance cross voltage and a constant.

10. The over-current protection method of claim 9, further comprising:
　determining whether a product of the current flowing through the transistor switch and a serial resistor achieves the over-current reference voltage or not to determine whether the current is higher than the current limit or not.

11. The over-current protection method of claim 9, further comprising:
　performing an over-current protection measurement when the current flowing through the transistor switch exceeds the current limit.

12. The over-current protection method of claim 9, wherein a length of the first duty cycle is negative related to an input voltage of the flyback power supply.

13. An over-current protection method for controlling a flyback power supply having a transformer, comprising:
　generating a control signal in a first period to control a transistor switch coupled to a primary side of the transformer, wherein the transistor switch is turned on in a first duty cycle of the control signal and the transistor switch is turned off in a second duty cycle of the control signal;
　generating a compensation current according to the second duty cycle in the first period;
　outputting the compensation current to an impedance unit to generate an impedance cross voltage in a shut-off period of the transistor switch of the first period; and
　determining an over-current reference voltage according to the impedance cross voltage to determine whether a current flowing through the transistor switch is higher than a current limit or not in a second period following by the first period according to the over-current reference voltage;
　wherein the control signal further includes a blank duty cycle, such that the first duty cycle, the second duty cycle and the blank duty cycle form the first period, wherein a total time period of the first duty cycle and the second duty cycle is fixed.

* * * * *